United States Patent
Hailey

(10) Patent No.: US 10,213,816 B2
(45) Date of Patent: Feb. 26, 2019

(54) PIPELINE PIG WITH HYDRAULICALLY BALANCED COLLAPSIBLE SEALING ELEMENTS

(71) Applicant: TDW Delaware, Inc., Wilmington, DE (US)

(72) Inventor: Jeffrey C. Hailey, Tulsa, OK (US)

(73) Assignee: TDW Delaware, Inc., Wilmington, DE (US)

( * ) Notice: Subject to any disclaimer, the term of this patent is extended or adjusted under 35 U.S.C. 154(b) by 515 days.

(21) Appl. No.: 14/692,417

(22) Filed: Apr. 21, 2015

(65) Prior Publication Data
US 2016/0310998 A1    Oct. 27, 2016

(51) Int. Cl.
*B08B 9/055* (2006.01)
*F16L 55/28* (2006.01)
(Continued)

(52) U.S. Cl.
CPC ............ *B08B 9/055* (2013.01); *B08B 9/0551* (2013.01); *B08B 9/0557* (2013.01); *F16L 55/28* (2013.01);
(Continued)

(58) Field of Classification Search
CPC . F16L 55/26; F16L 55/44; F16L 55/12; F16L 55/134; F16L 55/48; F16L 55/16; F16L 55/1283; F16L 101/12; F16L 55/28; F16L 55/30; F16L 55/38; F16L 55/40; G01M 3/005; G01M 3/223; G01M 3/246; G01M 3/2853; B08B 9/0553;
(Continued)

(56) References Cited

U.S. PATENT DOCUMENTS 3,600,736 A   8/1971   Smith et al.
3,751,932 A   8/1973   Matthews, Jr.
(Continued)

FOREIGN PATENT DOCUMENTS

CN   203599164   5/2014
CN   204062316   12/2014
(Continued)

OTHER PUBLICATIONS

Pushing The Boundaries of Dual Diameter Pig Design, Dave Bacon, Pipeline Engineering and Supply Company Limited, 2002.

*Primary Examiner* — Mark Spisich
(74) *Attorney, Agent, or Firm* — Gable Gotwals

(57) ABSTRACT

A pipeline pig that can traverse dual- or multiple-diameter pipes or pipelines has collapsible and expandable sealing elements that support the pig, provide a sliding (dynamic) seal with the pipe wall, and maintain the necessary pressure for driving or cleaning as the elements collapse and expand. The sealing elements each have an internal cavity sized to house a first volume of a fluid and a reservoir sized to house a second volume of the fluid. The cavity and reservoir are arranged so that a portion of the volumes of the fluid can move between each. An accumulator maintains a pressure of the first and second volumes of the fluid so that regardless of the sealing element's current size, or whether the element is transitioning between sizes, the element can maintain a sliding seal engagement with the pipe wall and perform the primary function of driving or cleaning (or both).

19 Claims, 6 Drawing Sheets

Fig. 4

(51) Int. Cl.
*F16L 55/38* (2006.01)
*F16L 55/40* (2006.01)
*F16L 55/44* (2006.01)
*F16L 101/12* (2006.01)

(52) U.S. Cl.
CPC ............... *F16L 55/38* (2013.01); *F16L 55/40* (2013.01); *F16L 55/44* (2013.01); *B08B 2209/055* (2013.01); *F16L 2101/12* (2013.01)

(58) Field of Classification Search
CPC ..... B08B 9/0551; B08B 9/055; B08B 9/0554; B08B 9/0557; B08B 2209/055; F28G 1/12
USPC ........................... 15/104.061, 104.17–104.19
See application file for complete search history.

(56) References Cited

U.S. PATENT DOCUMENTS

| | | |
|---|---|---|
| 3,863,287 A | 2/1975 | Knapp et al. |
| 3,890,665 A | 6/1975 | Richardson |
| 3,908,682 A * | 9/1975 | Thompson .......... F16L 55/1283 15/104.061 |
| 4,077,080 A * | 3/1978 | Ross .................... B08B 9/0553 15/104.061 |
| 4,406,030 A | 9/1983 | Platts |
| 5,797,993 A | 8/1998 | Woehleke |
| 6,796,463 B2 * | 9/2004 | Boal, Jr. ............. B67D 7/0244 138/93 |
| 6,857,158 B1 * | 2/2005 | Hunter ................. B08B 9/0553 134/167 C |
| 8,051,524 B2 | 11/2011 | Ferreira Lino et al. |
| 8,858,732 B1 | 10/2014 | Al-Qanaei |
| 8,894,772 B2 | 11/2014 | Phipps et al. |

FOREIGN PATENT DOCUMENTS

| | | | |
|---|---|---|---|
| GB | 1207090 A | 9/1970 | |
| GB | 2227805 A * | 8/1990 | .......... F16L 55/1283 |
| GB | 2217423 | 11/1992 | |
| RU | 2451868 | 5/2012 | |
| SU | 1657835 A1 | 6/1991 | |
| WO | 2004/028714 | 4/2004 | |

* cited by examiner

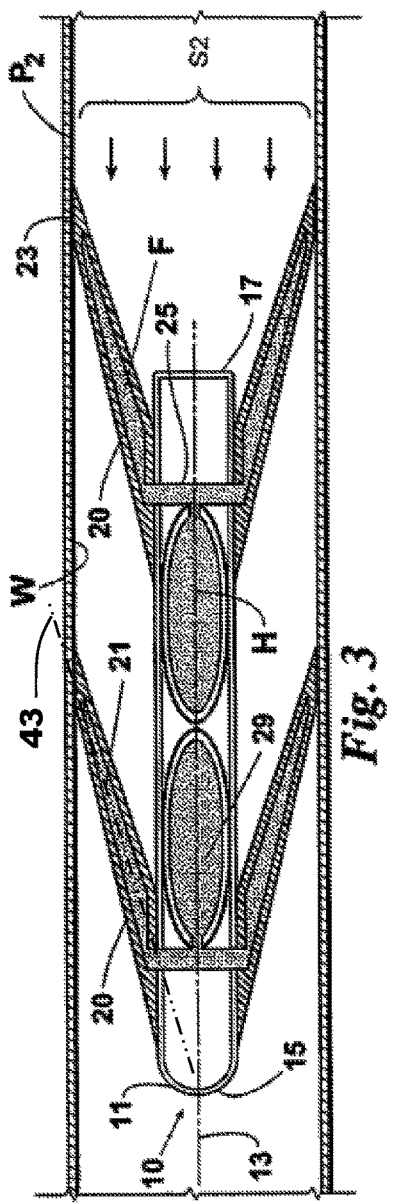
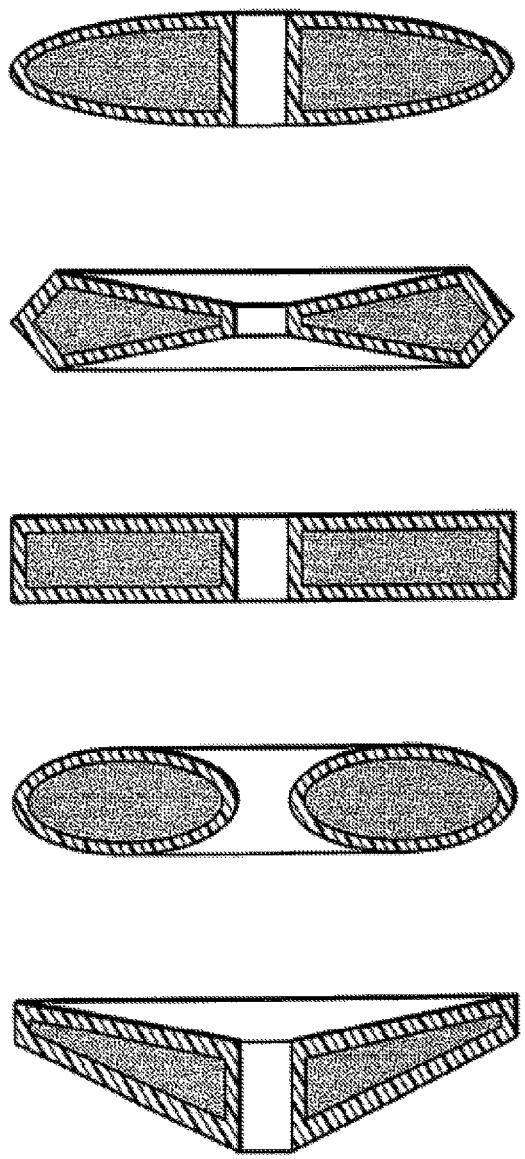
Fig. 3
Fig. 6A Fig. 6B Fig. 6C Fig. 6D Fig. 6E

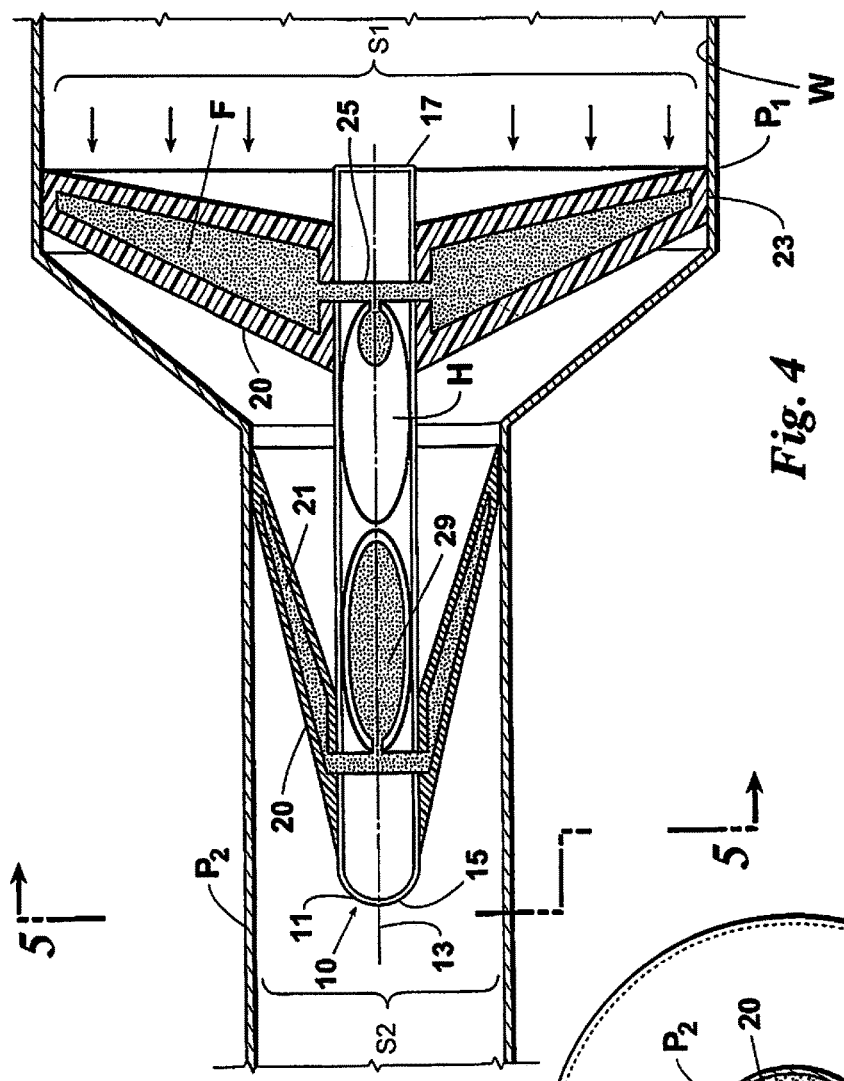
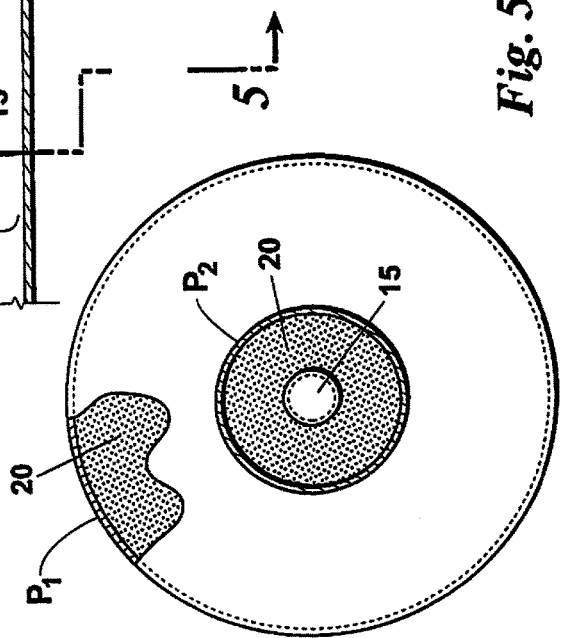

| FROM PIPE SIZE (mm) \ TO PIPE SIZE (mm) | 50 | 80 | 100 | 150 | 200 | 250 | 300 | 350 | 400 | 450 | 500 | 550 | 600 | 650 | 700 | 750 | 800 | 1000 | 1050 |
|---|---|---|---|---|---|---|---|---|---|---|---|---|---|---|---|---|---|---|---|
| 50 | 1.00 | 1.60 | 2.00 | 3.00 | 4.00 | 5.00 | 6.00 | 7.00 | 8.00 | 9.00 | 10.00 | 11.00 | 12.00 | 13.00 | 14.00 | 15.00 | 16.00 | 20.00 | 21.00 |
| 80 | 0.63 | 1.00 | 1.25 | 1.88 | 2.50 | 3.13 | 3.75 | 4.38 | 5.00 | 5.63 | 6.25 | 6.88 | 7.50 | 8.13 | 8.75 | 9.38 | 10.00 | 12.50 | 13.13 |
| 100 | 0.50 | 0.80 | 1.00 | 1.50 | 2.00 | 2.50 | 3.00 | 3.50 | 4.00 | 4.50 | 5.00 | 5.50 | 6.00 | 6.50 | 7.00 | 7.50 | 8.00 | 10.00 | 10.50 |
| 150 | 0.33 | 0.53 | 0.67 | 1.00 | 1.33 | 1.67 | 2.00 | 2.33 | 2.67 | 3.00 | 3.33 | 3.67 | 4.00 | 4.33 | 4.67 | 5.00 | 5.33 | 6.67 | 7.00 |
| 200 | 0.25 | 0.40 | 0.50 | 0.75 | 1.00 | 1.25 | 1.50 | 1.75 | 2.00 | 2.25 | 2.50 | 2.75 | 3.00 | 3.25 | 3.50 | 3.75 | 4.00 | 5.00 | 5.25 |
| 250 | 0.20 | 0.32 | 0.40 | 0.60 | 0.80 | 1.00 | 1.20 | 1.40 | 1.60 | 1.80 | 2.00 | 2.2 | 2.40 | 2.60 | 2.80 | 3.00 | 3.20 | 4.00 | 4.20 |
| 300 | 0.17 | 0.27 | 0.33 | 0.50 | 0.67 | 0.83 | 1.00 | 1.17 | 1.33 | 1.50 | 1.67 | 1.83 | 2.00 | 2.17 | 2.33 | 2.50 | 2.67 | 3.33 | 3.50 |
| 350 | 0.14 | 0.23 | 0.29 | 0.43 | 0.57 | 0.71 | 0.86 | 1.00 | 1.14 | 1.29 | 1.43 | 1.57 | 1.71 | 1.86 | 2.00 | 2.14 | 2.29 | 2.86 | 3.00 |
| 400 | 0.13 | 0.20 | 0.25 | 0.38 | 0.50 | 0.63 | 0.75 | 0.88 | 1.00 | 1.13 | 1.25 | 1.38 | 1.50 | 1.63 | 1.75 | 1.88 | 2.00 | 2.50 | 2.63 |
| 450 | 0.11 | 0.18 | 0.22 | 0.33 | 0.44 | 0.56 | 0.67 | 0.78 | 0.89 | 1.00 | 1.11 | 1.22 | 1.33 | 1.44 | 1.56 | 1.67 | 1.78 | 2.22 | 2.33 |
| 500 | 0.10 | 0.16 | 0.20 | 0.30 | 0.40 | 0.50 | 0.60 | 0.70 | 0.80 | 0.90 | 1.00 | 1.10 | 1.20 | 1.30 | 1.40 | 1.50 | 1.60 | 2.00 | 2.10 |
| 550 | 0.09 | 0.15 | 0.18 | 0.27 | 0.36 | 0.45 | 0.55 | 0.64 | 0.73 | 0.82 | 0.91 | 1.00 | 1.09 | 1.18 | 1.27 | 1.36 | 1.45 | 1.82 | 1.91 |
| 600 | 0.08 | 0.13 | 0.17 | 0.25 | 0.33 | 0.42 | 0.50 | 0.58 | 0.67 | 0.75 | 0.83 | 0.92 | 1.00 | 1.08 | 1.17 | 1.25 | 1.33 | 1.67 | 1.75 |
| 650 | 0.08 | 0.12 | 0.15 | 0.23 | 0.31 | 0.38 | 0.46 | 0.54 | 0.62 | 0.69 | 0.77 | 0.85 | 0.92 | 1.00 | 1.08 | 1.15 | 1.23 | 1.54 | 1.62 |
| 700 | 0.07 | 0.11 | 0.14 | 0.21 | 0.29 | 0.36 | 0.43 | 0.50 | 0.57 | 0.64 | 0.71 | 0.79 | 0.86 | 0.93 | 1.00 | 1.07 | 1.14 | 1.43 | 1.50 |
| 750 | 0.07 | 0.11 | 0.13 | 0.20 | 0.27 | 0.33 | 0.40 | 0.47 | 0.53 | 0.60 | 0.67 | 0.73 | 0.80 | 0.87 | 0.93 | 1.00 | 1.07 | 1.33 | 1.40 |
| 800 | 0.06 | 0.10 | 0.13 | 0.19 | 0.25 | 0.31 | 0.38 | 0.44 | 0.50 | 0.56 | 0.63 | 0.69 | 0.75 | 0.81 | 0.88 | 0.94 | 1.00 | 1.25 | 1.31 |
| 1000 | 0.05 | 0.08 | 0.10 | 0.15 | 0.20 | 0.25 | 0.30 | 0.35 | 0.40 | 0.45 | 0.50 | 0.55 | 0.60 | 0.65 | 0.70 | 0.75 | 0.80 | 1.00 | 1.02 |
| 1050 | 0.05 | 0.08 | 0.10 | 0.14 | 0.19 | 0.24 | 0.29 | 0.33 | 0.38 | 0.43 | 0.48 | 0.52 | 0.57 | 0.62 | 0.67 | 0.71 | 0.76 | 0.95 | 1.00 |

*Fig. 9*

PIPELINE PIG WITH HYDRAULICALLY BALANCED COLLAPSIBLE SEALING ELEMENTS

BACKGROUND OF THE INVENTION

Pipeline pigs are used to inspect, maintain and clean pipelines such as those used in oil-and-gas, chemical, and water distribution industries. The pigs include circumferential sealing elements arranged about the central body or mandrel of the pig. The sealing elements, which are typically made of an elastomeric material, use product flow to drive the pig forward under differential pressure while maintaining sealing engagement with an inner wall surface of the pipe. To help ensure this sealing engagement, the seal elements are sized for the constant internal diameter section of pipeline the pig is to be used in and tight clearances are required. If the next section of pipeline has a different (smaller) diameter cases, a different size pig must be used for the next section of pipeline.

Alternative types of dual-diameter pigs which can traverse different pipeline percentage changes include foam pigs, butterfly pigs, paddle pigs, and spring suspension pigs (see Dave Bacon, Pushing the Boundaries of Dual Diameter Pig Design (Pigging Products and Services Assoc., 2002), herein incorporated by reference). The operating envelope for each type of pig is limited (see e.g. FIG. 1) as are the pipe diameters the pigs can function in. For example, a dual diameter pig can function in two different diameters but not a diameter in between those two.

Foam pigs have dual diameter capability by default, but this capability is very limited. Butterfly pigs make use of slotted guide discs that collapse when in the smaller diameter line and another set of elements that provide sealing and drive functions in that line. Paddle pigs collapse into the smaller diameter line by rotation induced by chamfers on the paddle, with sealing provided by buckle-inducer type discs in the larger diameter line and by small diameter seals in the smaller line. Spring suspension or wheel pigs makes use of spring-loaded arms with wheels to center the pig and buckle-inducer type discs and small diameter seals for sealing in the larger and smaller diameter lines, respectively.

Therefore, a need exists for a multi-diameter pipeline pig that can traverse dual- and multiple-diameter pipelines with the same set of sealing elements providing sliding seal engagement with the inner wall surface of the pipe in the different diameter pipes and performing the primary function of drive or cleaning within those different diameter pipes.

SUMMARY OF THE INVENTION

A pipeline pig made according to this invention can traverse dual- or multiple-diameter pipes or pipelines because of collapsible (and expandable) sealing elements that can maintain the necessary pressure for driving or cleaning as the elements collapse and expand. The sealing elements each have an internal cavity sized to house a first volume of a fluid and a reservoir sized to house a second volume of the fluid. The cavity and reservoir are in communication with one another so that a portion of the volumes of the fluid can move between the internal cavity and the reservoir. An accumulator maintains a pressure of the first and second volumes of the fluid so that regardless of a sealing element's current size, or whether the element is transitioning between sizes, the element can perform its primary function of driving or cleaning (or both).

In a preferred embodiment of the pipeline pig, a first and a second elastomeric seal element are arranged about a central mandrel of the pipeline pig, with each elastomeric seal element having a first sliding seal diameter and a second different sliding seal diameter caused by changes in a volume of fluid housed in an internal cavity. The volume of fluid housed in the internal cavity is greater when in the first sliding seal diameter than in the second different sliding seal diameter. A first accumulator is in communication with the first elastomeric seal element and a second accumulator is in communication with the second elastomeric seal element, with each accumulator arranged to maintain a pressure of the volume of the fluid housed by the internal cavity of the respective elastomeric seal element.

Benefits of this design include but are not limited to a sliding seal is provided regardless of changes in pipe diameter, pipe-wall force is kept balanced due to hydraulic pressure, stress within the elastomer (urethane) sealing element is minimized due to support from a fluid rather than from a solid and therefore less likely to fail, and fluid volume and pressure are adjustable to conditions within the pipe (e.g., pressure, temperature, fluid).

BRIEF DESCRIPTION OF THE DRAWINGS

FIG. 3 is a cross-section view of the pipeline pig of FIG. 2 with the sealing elements shown in a second minimum diameter that provide a sliding seal as the pig traverses a smaller diameter pipe. A bladder-style accumulator ensures the sealing elements maintain a predetermined pressure to maintain the primary function of driving or cleaning.

FIG. 4 is a view of the pipeline pig of FIG. 2 as it traverses two different size pipes along a length of pipeline.

FIG. 5 is a view taken along section line 5-5 of FIG. 4.

FIGS. 6A to 6E show example cross-sections of preferred embodiments of the hydraulically balanced, collapsible sealing (or cleaning) elements.

FIG. 9 is a table showing various from and to pipe sizes that preferred embodiments of the sealing element made according to this invention can traverse (shaded area of table), the range of pipe sizes being in a range of about 3:1 (collapsing) and 1:3 (expanding).

ELEMENTS AND NUMBERING USED IN THE DRAWINGS AND DETAILED DESCRIPTION

Figure 1:
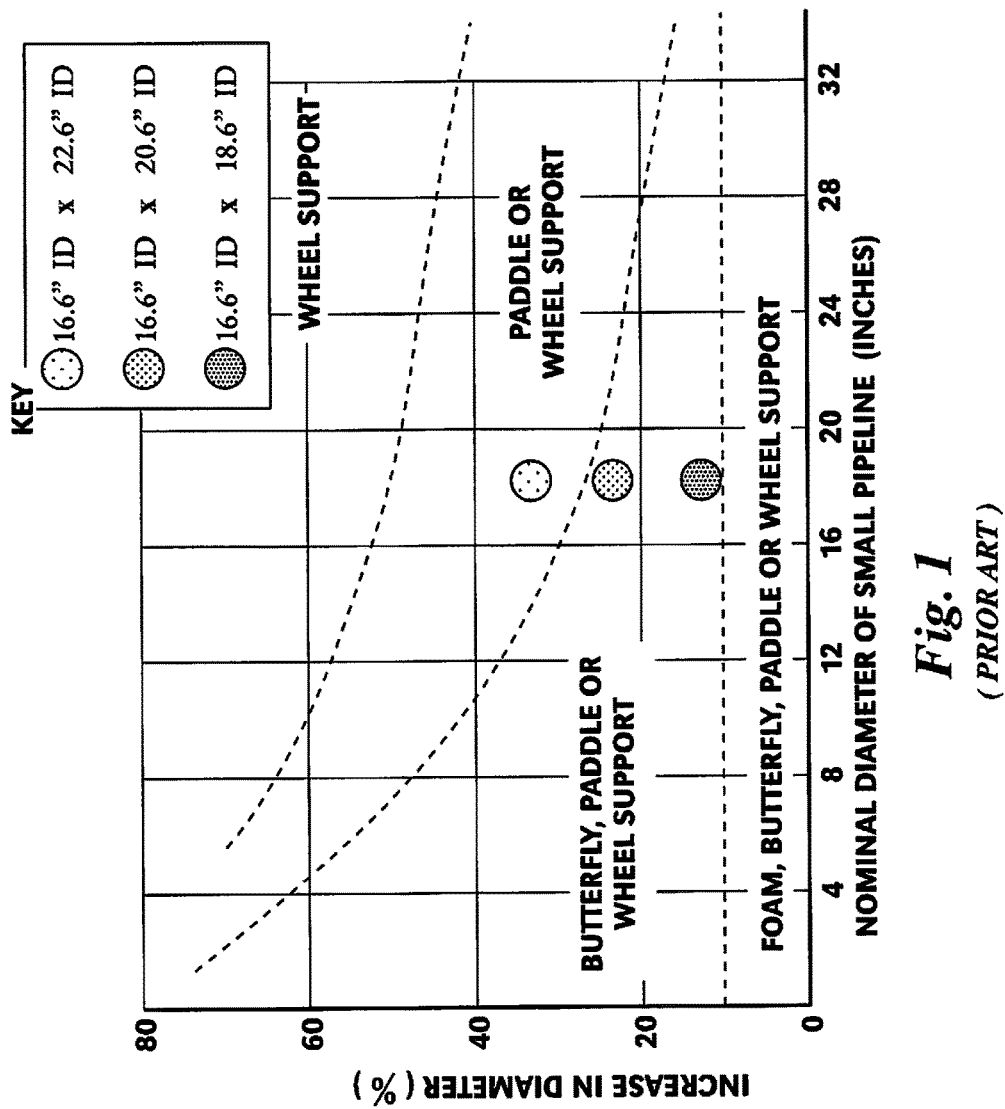
FIG. 1 is a prior art selection graph for dual diameter pipeline pigs based on a worst-case scenario of high friction pigging in a dry pipeline environment. The graph is reproduced from FIG. 1.1 of Dave Bacon, Pipeline Engineering and Supply Company Limited, *Pushing the Boundaries of Dual Diameter Pig Design* (Pigging Products and Services Association, 2002).
Figure 2:
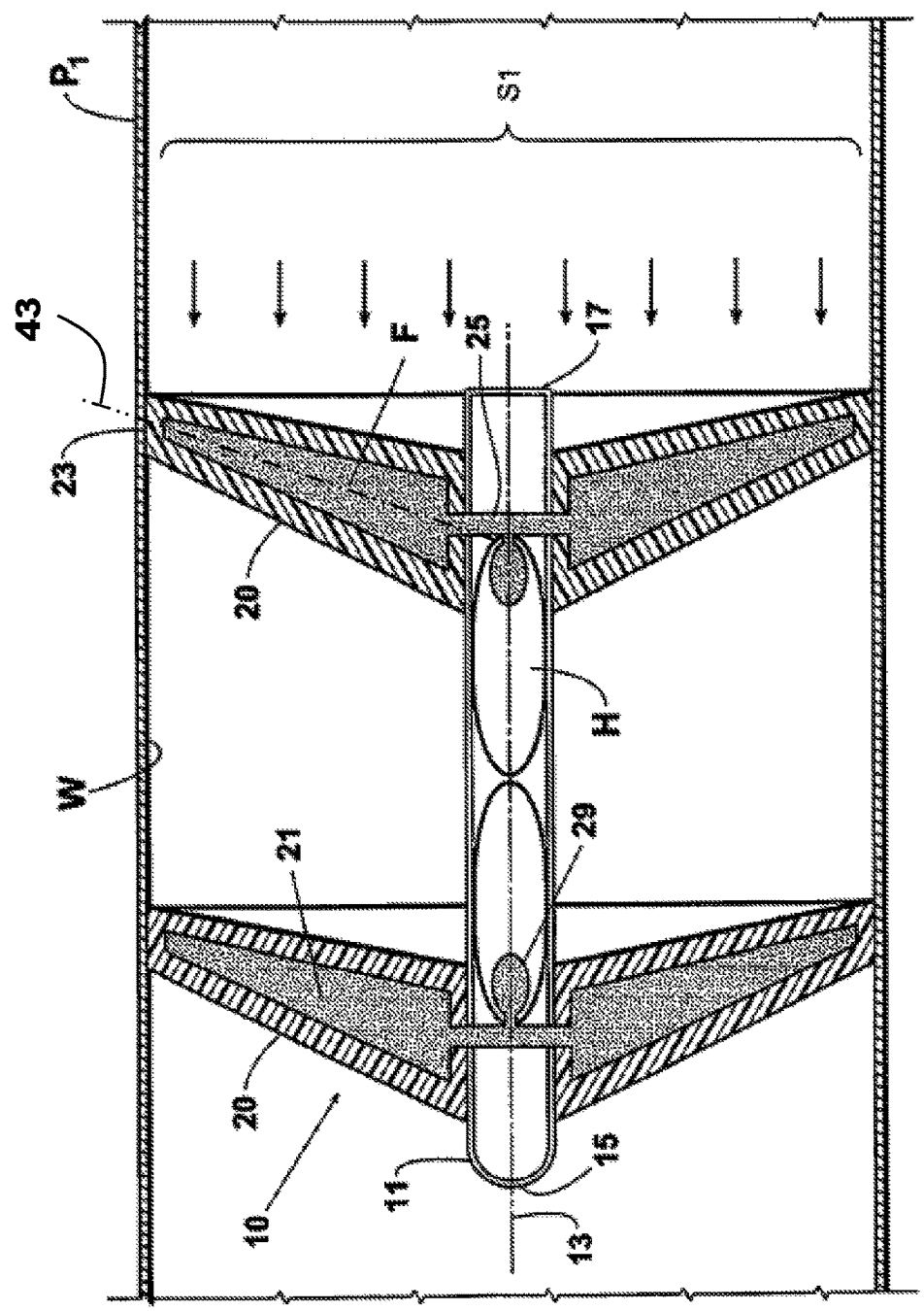
FIG. 2 is a cross-section view of a preferred embodiment of a pipeline pig having hydraulically balanced, collapsible sealing (or cleaning) elements made according to this invention. The sealing elements are shown in a first maximum diameter that provide a sliding (dynamic) seal in a larger diameter pipe and keep the pig moving forward in the pipeline under differential pressure.

10 Pipeline pig
11 Central longitudinal body or mandrel
13 Centerline of 11
15 Forward end
17 Rearward end
20 Collapsible and expandable sealing or cleaning element
21 Internal cavity
23 Outer circumferential surface (in sliding seal engagement with pipe wall)
25 Passageway
29 Reservoir
30 Accumulator
33 Piston
F Fluid, preferably liquid
H Hydraulic fluid or liquid
P1 Larger (or largest) diameter pipe
P2 Smaller (or smallest or intermediate) diameter pipe
S1 First size
S2 Second size
W Pipe wall

DETAILED DESCRIPTION

Preferred embodiments of a pipeline pig having hydraulically balanced, collapsible sealing (or cleaning) elements are described below. Because of an accumulator arranged to maintain a pressure within an internal cavity of each element, the elements are able to perform the primary function of driving or cleaning (or both) regardless of whether the element is at its maximum diameter, minimum diameter, or somewhere in between the maximum and minimum diameters. The elements provide a sliding (dynamic) seal with an opposing inner wall surface of the pipe and the pig continues to move forward under differential pressure. Unlike prior art dual-diameter pigs, the same sealing elements can perform the functions of sealing (and preferably also support) as the pig traverses different diameter pipes or sections of pipeline, including three or more different diameter pipes or sections. For the purpose of this disclosure, the maximum diameter corresponds to the largest diameter pipe for which the sealing element is sized and the minimum diameter corresponds to the smallest diameter pipe for which the sealing element is sized, the largest and smallest diameter pipes typically being part of the same pipeline and the sealing element providing a sliding seal for both diameter pipes, including diameters in between.

Referring to FIGS. 2 to 5, a pipeline pig 10 includes a pair of circumferential sealing elements 20 arranged about a central longitudinal axis 13 of the pig body or mandrel 11. Two or more sealing elements 20 may be used, with at least one element 20 located toward a forward end 15 of the pig 10 and another element 20 located toward a rearward end 17 of the pig 10. Together, the elements 20 support and help keep the pig 10 centered in a pipeline and perform the primary function of driving or cleaning (or both).

Figure 7:
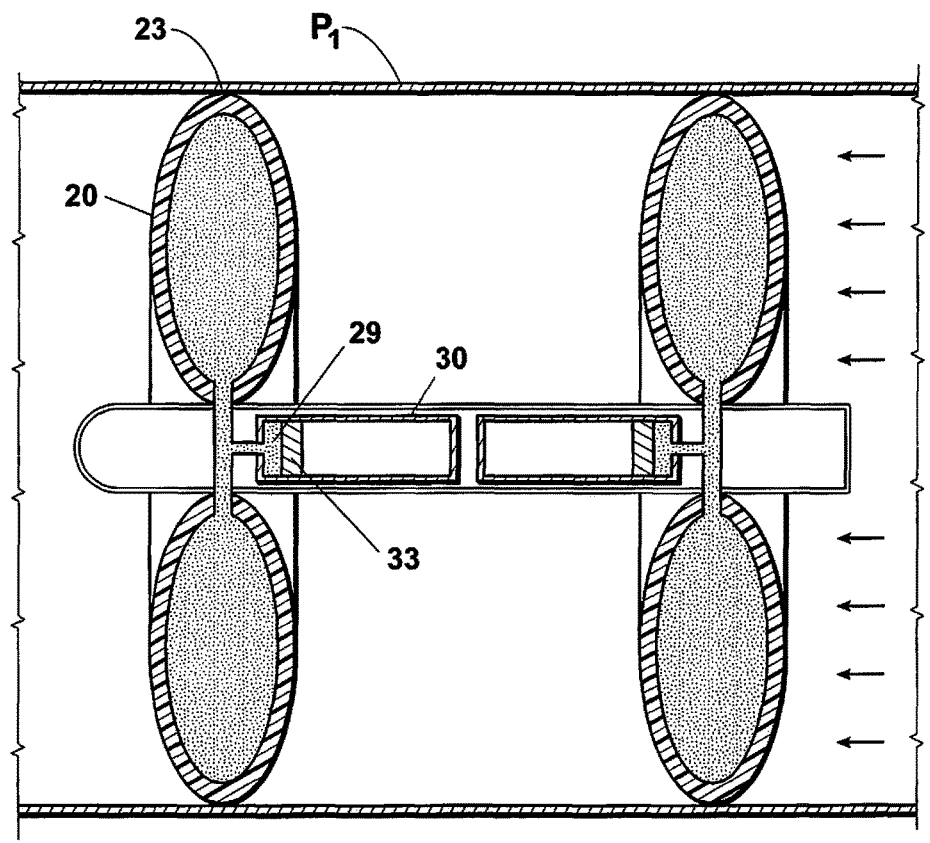
FIG. 7 is a cross-section view of another preferred embodiment of a pipeline pig having hydraulically balanced, collapsible sealing (or cleaning) elements made according to this invention. A piston-type accumulator ensures the sealing elements maintain a predetermined pressure to maintain the primary function of driving or cleaning.
Figure 8:
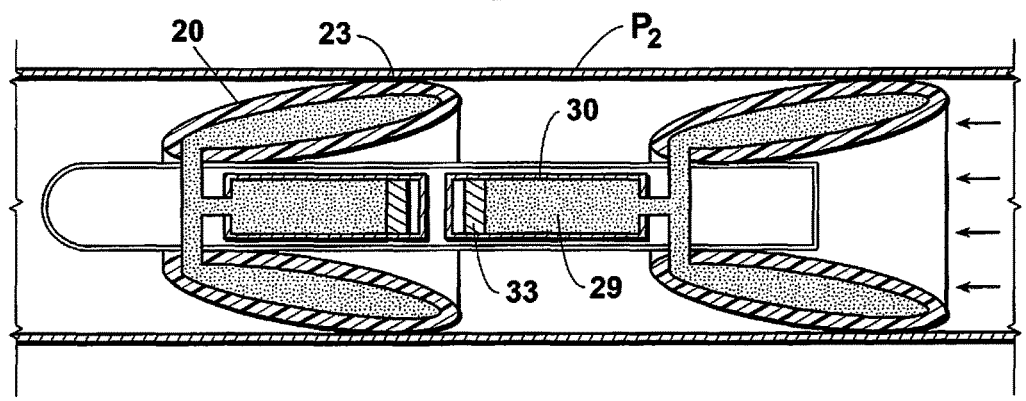
FIG. 8 is a cross-section view of the pipeline pig of FIG. 7 with the sealing elements shown in a second minimum diameter.

Preferably, the sealing elements 20 are made of an elastomeric material such as urethane or its equivalent. The elements 20 can be any shape preferable including elements that have a curve-shape in cross section or a polygonal-shape in cross-section (see FIGS. 6A-E, FIG. 6B being the preferred shape). Additionally, one or more of the sealing elements 20 could be configured as cleaning element, including but not limited to having a scraping or peeling edge. For certain cross-section shapes, the area of outer circumferential surface 23 in sliding seal engagement with the pipe wall P changes as sealing element 20 changes size (compare e.g. FIGS. 7 & 8).

Each sealing (or cleaning) element 20 is a hollow sealing element, having an internal cavity 21 sized to house a first volume of a fluid "F" and a reservoir 29 sized to house a second volume of the fluid F. Preferably, the fluid F is a liquid. The reservoir 29 and internal cavity 21 communicate with one another by way of a passageway 25 that permits a portion of the first and second volumes of the fluid F to between the internal cavity 21 and the reservoir 29. This movement of fluid F is triggered by the outer circumferential surface 23 of the sealing element 20 experiencing increased force or resistance as it transitions to a smaller diameter pipe or decreased force or resistance as it transitions to a larger diameter pipe.

Together, the internal cavity 21 and the reservoir 29 form a closed fluid containment system. As the first volume of fluid F increases in the internal cavity 21, the second volume of fluid F decreases in the reservoir 29 (and vice versa). Therefore, when the first volume is at its maximum, the second volume is at its minimum and sealing element 20 is at its maximum diameter or circumference. When the second volume is at its maximum, the first volume is at its minimum and sealing element 20 is at its minimum diameter or circumference. In this way, each sealing element 20 collapses or expands between a first size "S1" and a second different size "S2". In cases in which first size S1 corresponds to maximum diameter and second different size S2 corresponds to the minimum diameter, there are intermediate or in-between sizes of the sealing element 20 which provide sliding seal engagement. The centerline 43 of the sealing element 20, which extends in a lateral direction relative to the central longitudinal axis 13 of the mandrel 11, is at a different angle relative to the central longitudinal axis 13 of the mandrel 11 when the sealing element 20 is in the first size or diameter S1 than when in the second different size or diameter S2.

Generally speaking —and not taking into account other factors including but not limited to the mass of the pig, the type of material and shape being used for the sealing element, the pipeline fluid, or the surface of the pipe —the differential pressure required to drive the pig forward is inversely proportional to the pipe diameter:

$$\text{Force acting on the pig} = \text{Differential Pressure} \times \text{Area} \quad \text{(Eq. 1)}$$

A smaller differential pressure in a larger diameter line can generate more force on the pig than can, for example, a larger differential pressure in a much smaller diameter line. Typical, differential pressure (in bars) to drive different pipeline pig configurations is:

$$\text{Driving Differential Pressure} = K/\text{Nominal Diameter} \quad \text{(Eq. 2)}$$

where Nominal Diameter is in inches and the value of K is determined by the type of pig:

| Type of pig or tool | K |
|---|---|
| Sphere and foam | 1 |
| 2-cup | 4 |
| 4-cup | 7 |
| Disc | 9 |
| Cup and brush | 12 |
| Disc and brush | 15 |

-continued

| Type of pig or tool | K |
|---|---|
| UT in-line inspection | 19 |
| MFL in-line inspection | 24 |

All things being equal, as the nominal diameter of the sealing elements increases, the differential pressure required to drive the pig decreases. Once the pig 10 is set in motion by the differential pressure, the pressure being maintained in sealing element 20 by accumulator 30 is effective for providing a sliding seal against an opposing surface of the pipe wall "W" as pig 10 is moved forward under the driving differential pressure.

The pressure provided by accumulator 30 is "balanced" so that pig 10 moves forward under differential pressure while sealing elements 20 maintain their sliding seal engagement with the pipe wall W. Preferably, the accumulator 30 in combination with sealing element 20 is not configured or arranged to provide the amount of pressure required for pig 10 to perform as a stationary, temporary plug. However, pig 10 could slow at times or momentarily stall in its movement depending on the operating environment or pipe conditions. When in a stall condition, because the sealing elements 20 remain in sliding seal engagement with the pipe wall W, pipeline pressure continues to build up behind pig 10 and reaches a point where pig 10 begins to move forward again under differential pressure.

The ratio between the first size S1 and second different size S2 of the sealing element 20 can be determined empirically based upon the application. For example, the ratio could be 3:1, which would allow the pig 10 to traverse a pipeline having sections of pipe that vary in diameter from one another within this same range. In other preferred embodiments, the first diameter (size S1) is at least 1.05 times that of the second different diameter (size S2), at least 1.5 times that of the second diameter, or at least 3 times that of the second diameter (see e.g. FIG. 5 showing a 3:1 ratio and FIG. 9 showing preferred ratios).

Regardless of whether the sealing elements 20 are collapsing or expanding between the first and second different sizes S1, S2 (or between intermediate sizes), the sealing elements 20 maintain a sliding seal engagement with the opposing inner wall surface "W" of the pipe so as to perform the primary function of driving or cleaning. At times, the forward sealing element 20 could be a different size than the rearward sealing element 20 as the forward element 20 transitions from a larger diameter pipe "P1" into a smaller or intermediate diameter pipe "P2" prior to the other element 20 reaching the smaller diameter pipe P2 (see FIGS. 4 & 5).

The ability to maintain the needed pressure while traversing multi-diameter pipes or pipelines is a unique and inventive feature of pig 10. At least one accumulator 30 is arranged within the central mandrel 11 and holds pressure on the fluid in the internal cavity 21 and reservoir 29. Accumulator 30 can be a bladder-style or piston-style accumulator (see FIGS. 2, 3, 7 & 8) housing an hydraulic fluid "H" for maintaining pressure against fluid "F". Additionally, a single accumulator 30 could be arranged to service two or more sealing elements 20, or each sealing element 20 could have its own accumulator 30.

The accumulator 30 is sized so the volume of the fluid F residing in reservoir 29 can, when the volume is at its maximum, still maintain the pressure required for the sealing elements 20—which would now be at their minimum working circumference or diameter—to perform the function of driving or cleaning in the smaller diameter pipe. The same holds true when the volume of the fluid residing in reservoir 29 is at its minimum with the sealing elements at their maximum working circumference or diameter.

Because of accumulator 30, whether sealing element 20 is collapsing or expanding, the size of the sealing element 20 is "self-correcting" relative to pipe diameter and provides a sliding seal as pig 10 is moved forward under differential pressure. Therefore, pig 10 can traverse multiple diameter sections of pipeline with the same set of sealing elements 20 providing the sliding seal engagement throughout.

What is claimed:

1. A pipeline pig comprising:
    a central mandrel;
    a hollow elastomeric seal element arranged about said central mandrel of the pipeline pig and having a centerline extending laterally outward relative to the central mandrel, said hollow elastomeric seal element defining an internal cavity surrounded by said hollow elastomeric seal element, the hollow elastomeric seal element arranged to move between a first diameter corresponding to a first diameter pipeline to be traversed and a second different diameter corresponding to a second different diameter pipeline to be traversed, said hollow elastomeric seal element containing only a volume of fluid, said volume of fluid housed in said internal cavity of the hollow elastomeric seal element being greater when in the first diameter than in the second different diameter; and
    an accumulator in communication with the hollow elastomeric seal element and forming a closed fluid containment system with the internal cavity of the hollow elastomeric seal element, the accumulator arranged to self-balance a sliding seal pressure of the volume of fluid housed by the internal cavity of the hollow elastomeric seal element with a differential driving pressure of the pipeline pig when in the first diameter and the second different diameter;
    wherein the first diameter is a maximum diameter of the pipeline pig when traversing the first diameter pipeline under differential pressure and the second different diameter is a maximum diameter of the pipeline pig when traversing the second diameter pipeline under differential pressure; and
    wherein the centerline of the hollow elastomeric seal element is at a different angle relative to the central mandrel when the hollow elastomeric seal element is in the first diameter than when in the second different diameter.

2. The pipeline pig according to claim 1 wherein the elastomeric seal element is curve-shaped in cross section.

3. The pipeline pig according to claim 1 wherein the elastomeric seal element is polygonal shaped in cross-section.

4. The pipeline pig according to claim 1 wherein the elastomeric seal element is configured as a cleaning element.

5. The pipeline pig according to claim 1 wherein the first sliding seal diameter is in a range of 1.05 times to 3.0 times that of the second different sealing diameter.

6. A pipeline pig comprising:
    an elastomeric seal element arranged about a central mandrel of the pipeline pig and having a centerline extending laterally outward relative to the central mandrel and an internal cavity surrounded by said elastomeric seal element, said internal cavity sized to house a first volume of a fluid and a reservoir sized to house a second volume of the fluid, the reservoir arranged so a portion of the said volumes of the fluid can move between the internal cavity and the reservoir; and at least one accumulator arranged to self-balance a sliding seal pressure of the first and second volumes of the fluid with a differential driving pressure of the pipeline pig, the internal cavity and the at least one accumulator forming a closed fluid containment system, the sliding seal pressure being effective for the elastomeric seal element to form a first sliding seal diameter corresponding to a first diameter pipeline and a second different sliding seal diameter corresponding to a second different diameter pipeline, said sliding seal diameters being a maximum diameter of the pipeline pig when traversing a respective first or second different diameter pipeline under differential pressure;

wherein said elastomeric seal element contains only said fluid; and wherein the centerline of the elastomeric seal element is at a different angle relative to the central mandrel when in the first sliding seal diameter than when in the second different sliding seal diameter.

7. The pipeline pig according to claim 6 wherein the sliding seal pressure is effective for the elastomeric seal element to form an intermediate sliding seal diameter between the first and second different sliding seal diameters.

8. The pipeline pig according to claim 6 wherein a total volume of the accumulator is less than the second volume of the fluid when the second volume of fluid is at a maximum.

9. The pipeline pig according to claim 6 wherein the accumulator is housed by the central mandrel of the pipeline pig.

10. The pipeline pig according to claim 6 wherein the reservoir is housed within the accumulator.

11. The pipeline pig according to claim 6 wherein the fluid is a liquid.

12. The pipeline pig according to claim 6 wherein the elastomeric seal element is curve-shaped in cross section.

13. The pipeline pig according to claim 6 wherein the elastomeric seal element is polygonal shaped in cross-section.

14. The pipeline pig according to claim 6 wherein the elastomeric seal element is configured as a cleaning element.

15. The pipeline pig according to claim 6 wherein the first sliding seal diameter is 1.05 times that of the second different sliding seal diameter.

16. The pipeline pig according to claim 6 wherein the first sliding seal diameter is 1.5 times that of the second different sliding seal diameter.

17. The pipeline pig according to claim 6 wherein the first sliding seal diameter is 3.0 times that of the second different sliding seal diameter.

18. The pipeline pig according to claim 6 wherein the pipeline pig does not require an element separate from that of the elastomeric seal element to support the pipeline pig within a pipe.

19. The pipeline pig according to claim 6 wherein the first sliding seal diameter is in a range of 1.05 times to 3.0 times that of the second different sealing diameter.

* * * * *